US006778383B2

(12) United States Patent
Ho

(10) Patent No.: US 6,778,383 B2
(45) Date of Patent: Aug. 17, 2004

(54) ADD-ON DISPLAY MODULE FOR PORTABLE COMPUTER

(75) Inventor: Min-Tang Ho, Hsinchu (TW)

(73) Assignee: Mitac Technology Corp., Hsin-Chu (TW)

( * ) Notice: Subject to any disclaimer, the term of this patent is extended or adjusted under 35 U.S.C. 154(b) by 0 days.

(21) Appl. No.: 10/392,919

(22) Filed: Mar. 21, 2003

(65) Prior Publication Data

US 2004/0136150 A1 Jul. 15, 2004

(30) Foreign Application Priority Data

Jan. 24, 2003 (JP) ........................................ 92201371 U

(51) Int. Cl.⁷ ................................................ G06F 1/16
(52) U.S. Cl. ........................ 361/681; 361/683; 248/917; 248/918
(58) Field of Search ................................ 361/681–683; 348/822, 825, 836; 353/119–122; 248/917, 918; 312/223.1, 223.2; 345/169, 905

(56) References Cited

U.S. PATENT DOCUMENTS 5,796,577 A * 8/1998 Ouchi et al. ................ 361/681
6,667,877 B2 * 12/2003 Duquette .................... 361/681
2003/0142469 A1 * 7/2003 Ponx ........................... 361/683
2003/0218860 A1 * 11/2003 Shiraiwa ..................... 361/681
2004/0042163 A1 * 3/2004 Tutikawa .................... 361/683

* cited by examiner

Primary Examiner—Darren Schuberg
Assistant Examiner—Anthony Q. Edwards
(74) Attorney, Agent, or Firm—Rosenberg, Klein & Lee

(57) ABSTRACT

An add-on display module for a portable computer includes a mounting frame and a secondary display device framed in the mounting frame. The mounting frame is provided with fixing members. A first connector is provided on the primary display device of the portable computer and a second connector is provided on the secondary display device. The secondary display device is attached on a rear side of the primary display device of the portable computer by means of the mounting frame and electrically connected with the primary display device via the first connector and the second connector, so as to receive and display the image signal transmitted from the portable computer.

9 Claims, 6 Drawing Sheets

ADD-ON DISPLAY MODULE FOR PORTABLE COMPUTER

BACKGROUND OF THE INVENTION

1. Field of the Invention

The present invention relates to a display device for a computer, and more particularly to an add-on display module detachably attached to a portable computer to serve as an auxiliary display device in the course of a business briefing, a commercial advertising, a lecture, a forum, etc.

2. Description of the Prior Art

A display device is an essential output device for a computer system. With the display device, a computer user may well handle various outputs from the computer and control various functions of the computer system in accordance with the displayed information shown on the display. Particularly, a portable or notebook computer could be used in a variety of applications due to its portable feature. For example, a projecting apparatus may be connected to the computer system for use in commercial advertising, business briefing, academic seminar, product exhibition, lecture, etc. to serve as an auxiliary apparatus for showing images. However, the user must purchase a full set of expensive digital projecting apparatus to work with the computer system and complete connection of cables of the projecting apparatus to the computer system to allow transmission of images or pictures to be projected from the computer system to the projecting apparatus. Finally, the desired images or pictures are projected via optical projecting lenses of the projecting apparatus onto a wide projection screen set at some distance away from the projecting apparatus. Therefore, as a matter of fact, there are still many inconveniences in using the computer-connected projecting apparatus.

In fact, it is not always necessary to use the above-mentioned projecting apparatus in some occasions involving in business briefing, picture display, etc. Also, a suitable projection screen is not always available everywhere. What is needed may be simply a means to show some images. Therefore, many people who might need to make a briefing would usually use the LCD panel of a notebook computer to show desired images or documents.

However, in the current way of using the LCD panel of the notebook computer to show images or documents, only an operator of the computer is allowed to clearly view the images and/or documents shown on the LCD panel. As being limited by a location of the computer and viewing angle, people other than the operator do not easily clearly see the images in the LCD panel. This condition prevents the notebook computer from being widely used in business briefing, lecture, forum, etc.

In some recently designed notebook computers, an additional monitor may be externally connected to the existing LCD panel of the notebook computer via suitable cables and connectors. However, in the practical use of such design, it would be very inconvenient for the notebook computer user to carry the cables, the connectors, and the additional monitor along with the notebook computer.

It is therefore desirable to develop an auxiliary display device that is suitable for use with a portable computer system without detriment to the small and compact volume and the convenient use of the portable computer.

SUMMARY OF THE INVENTION

A primary object of the present invention is to provide an add-on display module adapted to be attached to a primary display panel of a portable computer, so that the add-on display module may be conveniently used as an auxiliary display device when the portable computer is used in a business briefing, a commercial advertising, a lecture, or a forum.

Another object of the present invention is to provide an add-on display module the can be easily connected to and detached from a notebook computer, so that a user who needs to display images in two directions at the same time may directly connect the add-on display module to a rear side of a primary display device panel of the notebook computer in a very simple manner.

To achieve the above objects, in accordance with the present invention, an add-on display module includes a mounting frame and a secondary display device framed in the mounting frame. The mounting frame is provided with fixing members. A first connector is provided on the primary display device of the portable computer and a second connector is provided on the secondary display device. The secondary display device is attached on a rear side of the primary display device of the portable computer by means of the mounting frame and electrically connected with the primary display device via the first connector and the second connector, so as to receive and display the image signal transmitted from the portable computer.

With the add-on display module of the present invention, a portable computer may have the function of dual display devices. That is, in addition to a primary LCD display device, the notebook computer has a secondary display device provided at a back of the primary display device to serve as an auxiliary display device for convenient use in business briefing, commercial advertising, lecture, forum, etc. With the add-on display module of the present invention, all limitations in using, wiring, and carrying a conventional projecting apparatus are avoided. Moreover, the add-on display module of the present invention has a low profile that further enables easy and convenient mounting, connecting, and carrying thereof without causing inconvenience to the user.

BRIEF DESCRIPTION OF THE DRAWINGS

The present invention will be apparent to those skilled in the art by reading the following description of a preferred embodiment of the present invention, with reference to the attached drawings, in which.

DETAILED DESCRIPTION OF THE PREFERRED EMBODIMENTS

Figure 1:
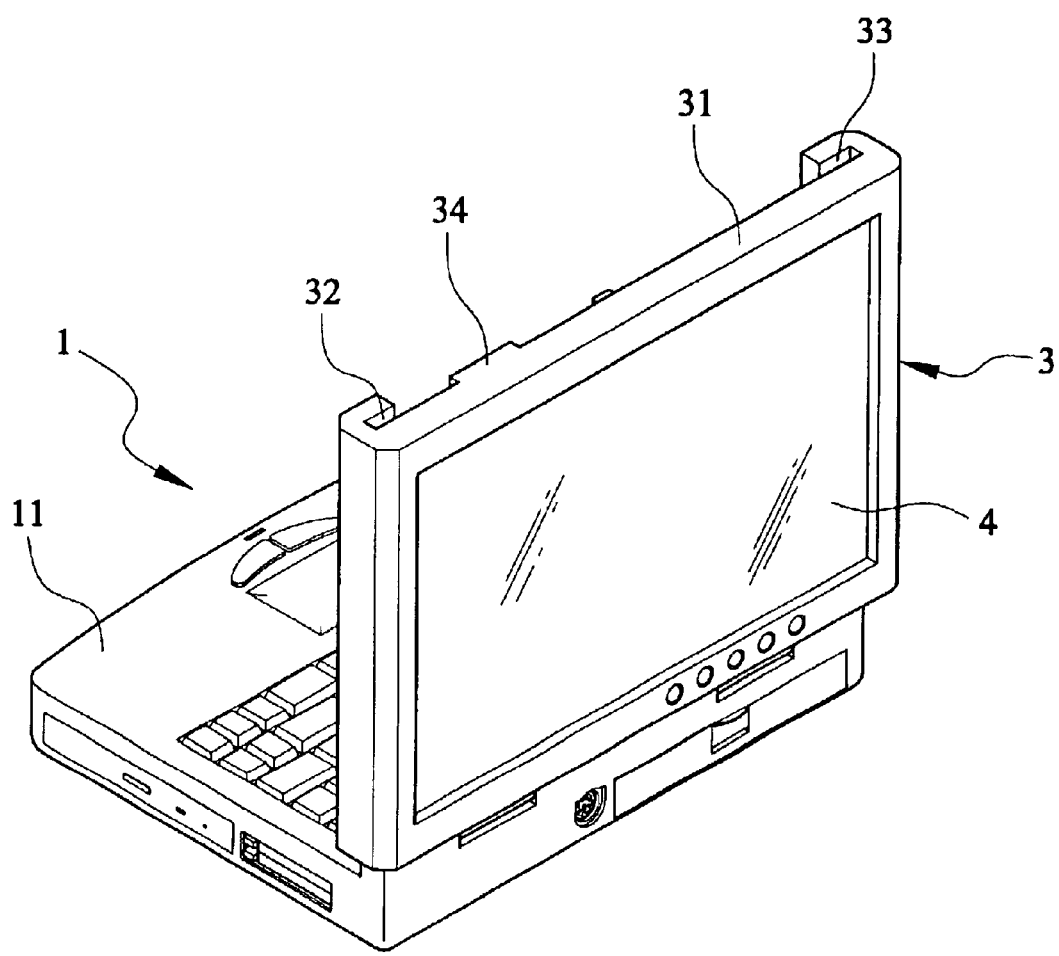
FIG. 1 is a rear perspective view of a notebook computer showing an add-on display module according to a first embodiment of the present invention is attached to a rear side of a primary display device of the notebook computer.
Figure 2:
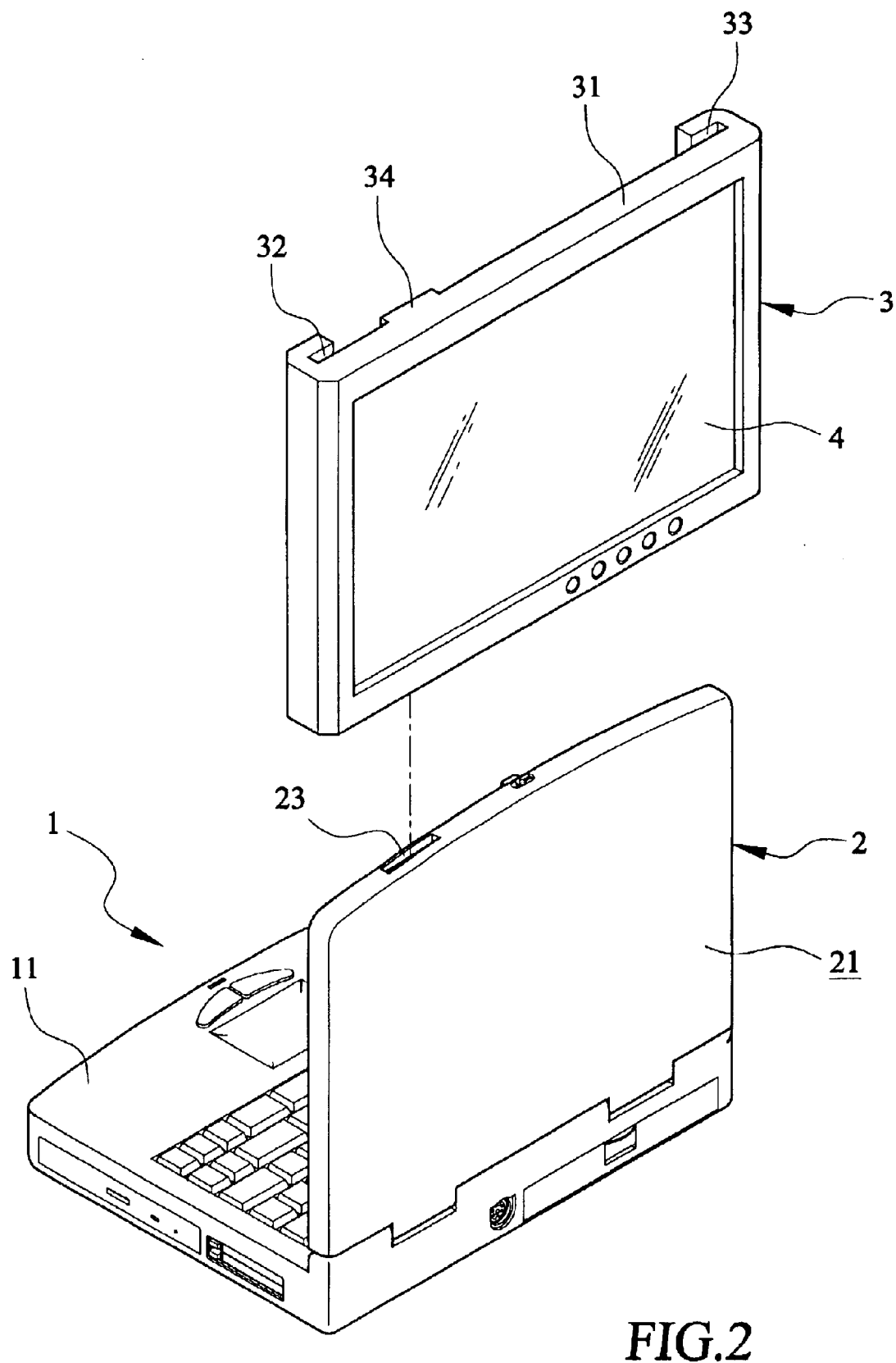
FIG. 2 is an exploded perspective view of FIG. 1 showing the add-on display module is detached from the primary display device of the notebook computer.

FIG. 1 is a rear perspective view of a notebook computer showing an add-on display module according to a first embodiment of the present invention is attached to a rear side of a primary display device of the notebook computer, and FIG. 2 is an exploded perspective view of FIG. 1 showing the add-on display module is detached from the primary display device of the notebook computer.

As shown, the portable computer or notebook computer, which is generally denoted by reference numeral 1, mainly includes a mainframe casing 11 and a primary display device 2. In the example illustrated in FIG. 1, the primary display device 2 is a liquid crystal display (LCD) which is pivotally connected to a rear edge of the mainframe casing 11. The add-on secondary display module, which is generally denoted by reference numeral 3, is detachably attached to a rear side 21 of the primary display device 2 of the notebook computer 1, and includes a mounting frame 31 for fixedly mounting a secondary display device 4 therein.

The mounting frame 31 of the add-on display module 3 of the present invention is provided at two opposite sides with a pair of fixing members 32 and 33, which may be, for example, a pair of U-sectioned brackets or sliding rails with two open sides thereof facing toward each other, so that the mounting frame 31 may be attached to the primary display device 2 by holding or sliding the side brackets or sliding rails 32, 33 onto two opposite sides of the primary display device 2, and thereby the secondary display device 4 may be located at the rear side 21 of the primary display device 2 of the notebook computer 1.

In this first embodiment of the present invention, the mounting frame 31 has a width and a length identical or similar to that of the primary display device 2. Whereby when the mounting frame 31 and the secondary display device 4 mounted in the mounting frame 31 are attached to the rear side 21 of the primary display device 2 of the notebook computer 1, the primary display device 2 and the secondary display device 4 together form a display device having a front display panel 22 (see FIG. 3) and a back display panels, that is, the secondary display device 4. An operator of the notebook computer 1 may watch the front display panel 22 on the primary display device 2, while other viewers may watch the secondary display device 4 to see the same images shown on the primary display device 2 at the same time.

Of course, in designing the add-on display module 3, it is also possible for the secondary display device 4 to show images that are different from image shown on the notebook computer 1. For example, in some applications, a computer operator may do word processing on the primary display device 3 of the notebook computer 1 while another person is watching a picture transmitted from the notebook computer 1 via the secondary display device 4 of the add-on display module 3.

Figure 3:
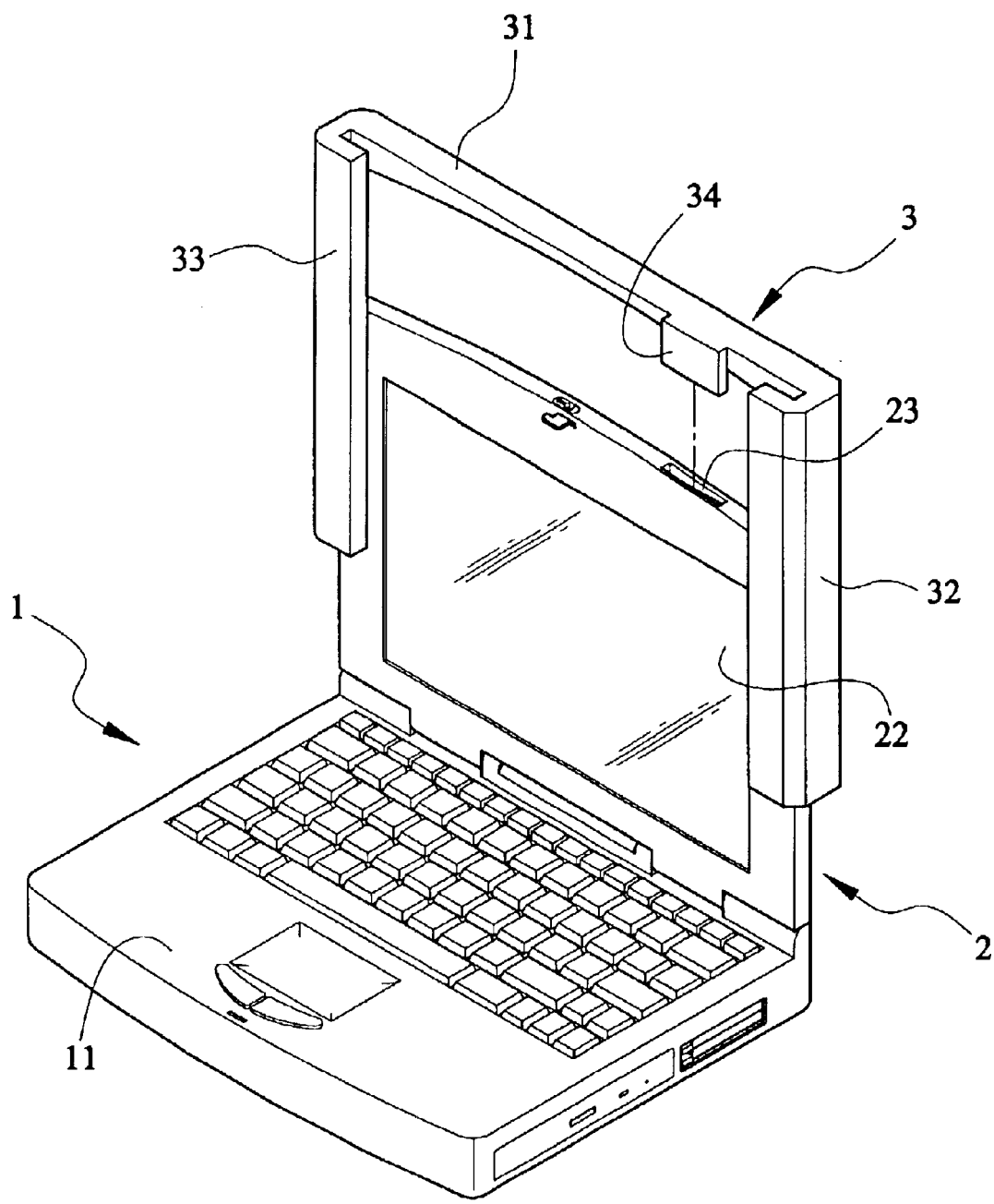
FIG. 3 is a front perspective view of FIG. 1 showing the add-on display module is partially detached from the primary display device of the notebook computer.

Please refer to FIG. 3 that is a front perspective view of FIG. 1 with the add-on display module 3 being partially detached from the primary display device 2 of the notebook computer 1. As can be seen from FIG. 3, there is a first connector 23, which may be, for example, a female connector or a socket, provided at an upper edge of the primary display device 2, and a second connector 34, which may be, for example, a male connector or a plug, downward provided at an upper edge of the add-on display module 3 in correspondence to the first connector 23. The first and the second connector 23, 34 together constitute an insertion-type electrical connecting means in the present invention. When the add-on display module 3 is attached to the rear side 21 of the primary display device 2 of the notebook computer 1, the second connector 34 is fitly electrically connected to and located in the first connector 23, enabling the add-on display module 3 to receive image signals from the notebook computer 1 via the electrically connected first and second connectors 23, 34.

The above-mentioned insertion-type electrical connecting means including the first and the second connector 23, 34 may be otherwise replaced by an infrared emitting port and a corresponding infrared receiving port, respectively, to transmit the image signals from the notebook computer 1 to the add-on display module 3 via infrared interface. That is, when the secondary display device 4 is attached to the rear side 21 of the primary display device 2 of the notebook computer 1, the two corresponding infrared ports will enable data transmission between the primary display device 2 and the secondary display device 4. Of course, it is also possible to achieve the electrical connection of the primary display device 2 to the add-on display module 3 by wires (not shown) connected to and extended between the first and the second connector 23, 34.

In the present invention, the secondary display device 4 is internally provided with a control circuit, which may include only a basic inverting circuit for driving a liquid crystal display, instead of including all control circuits for a complete liquid crystal display. Moreover, since the add-on display module 3 may be connected in parallel with the primary display device 2 of the notebook computer 1 to receive outputs from a display circuit of the primary display device 2, it is possible for the secondary display device 4 to be a LCD panel having a small thickness, and synchronous image signals can be sent from the notebook computer 1 via the electrical connecting means to display on the secondary display device 4.

Of course, it is also possible for the secondary display device 4 to internally include all control circuits for a complete LCD and thereby have image processing and displaying functions as a general LCD panel does. In this case, the secondary display device 4 could receive RGB (red, green, and blue) image signals from a general monitor or LCD via the electrical connecting means.

Figure 4:
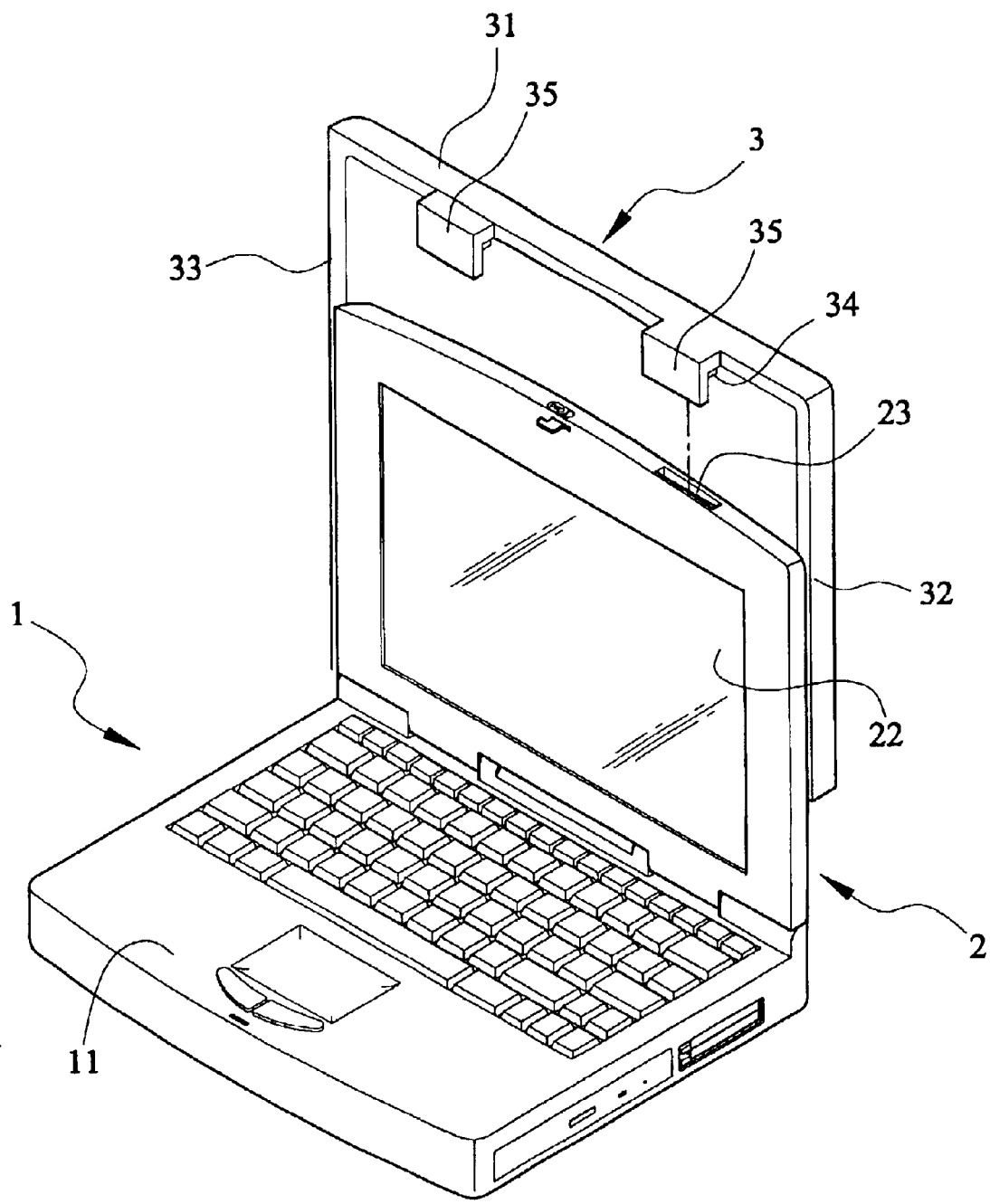
FIG. 4 is a front perspective view of a notebook computer showing an add-on display module according to a second embodiment of the present invention is attached to a rear side of a primary display device of the notebook computer.

FIG. 4 is a front perspective view of a notebook computer showing an add-on display module according to a second embodiment of the present invention is attached to a rear side of a primary display device of the notebook computer. This second embodiment is generally structurally similar to the first embodiment, except that the add-on display module 3 of the second embodiment includes a pair of fixing members 35 in the form of two L-sectioned hooks projected from an inner side of the add-on display module 3 opposite to the secondary display device 4. The mounting frame 31 with the secondary display device 4 framed therein is attached to the rear side 21 of the primary display device 2 of the notebook computer 1 by engaging the hooks 35 with the upper edge of the primary display device 2.

Figure 5:
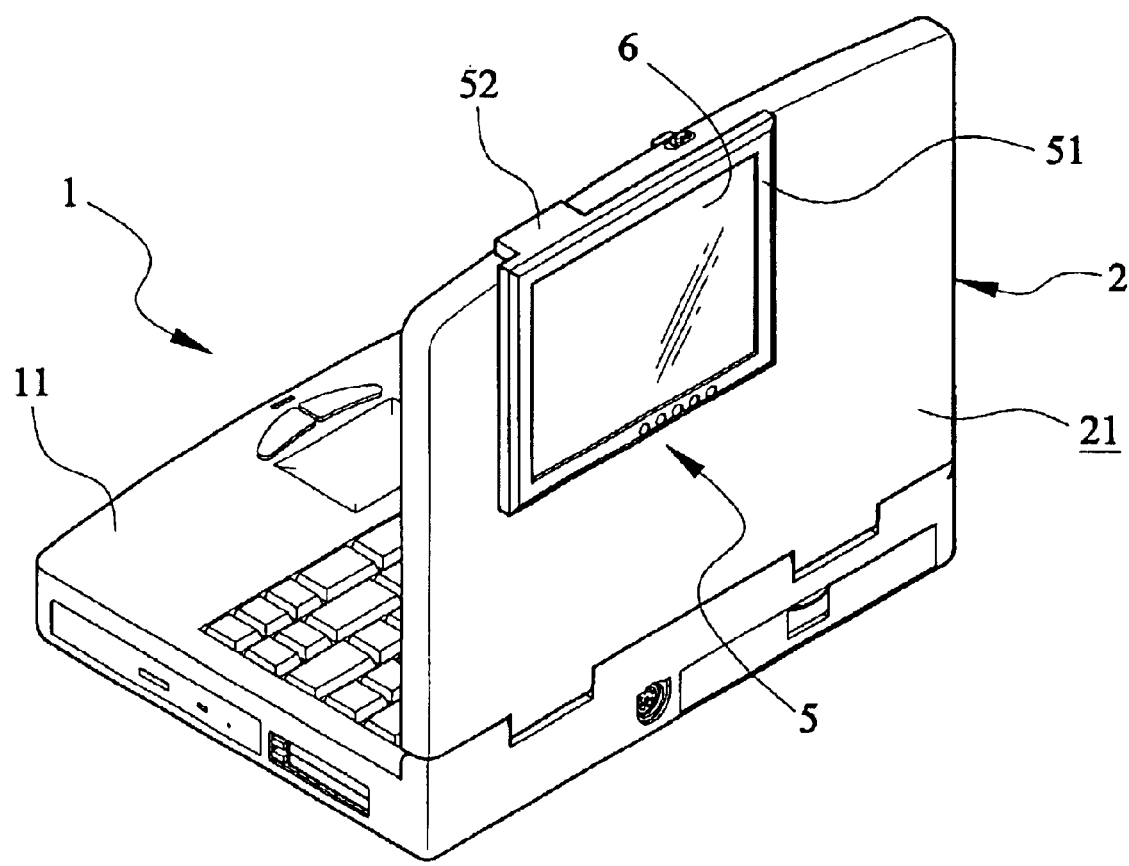
FIG. 5 is a rear perspective view of a notebook computer showing an add-on display module according to a third embodiment of the present invention is attached to a rear side of a primary display device of the notebook computer.
Figure 6:
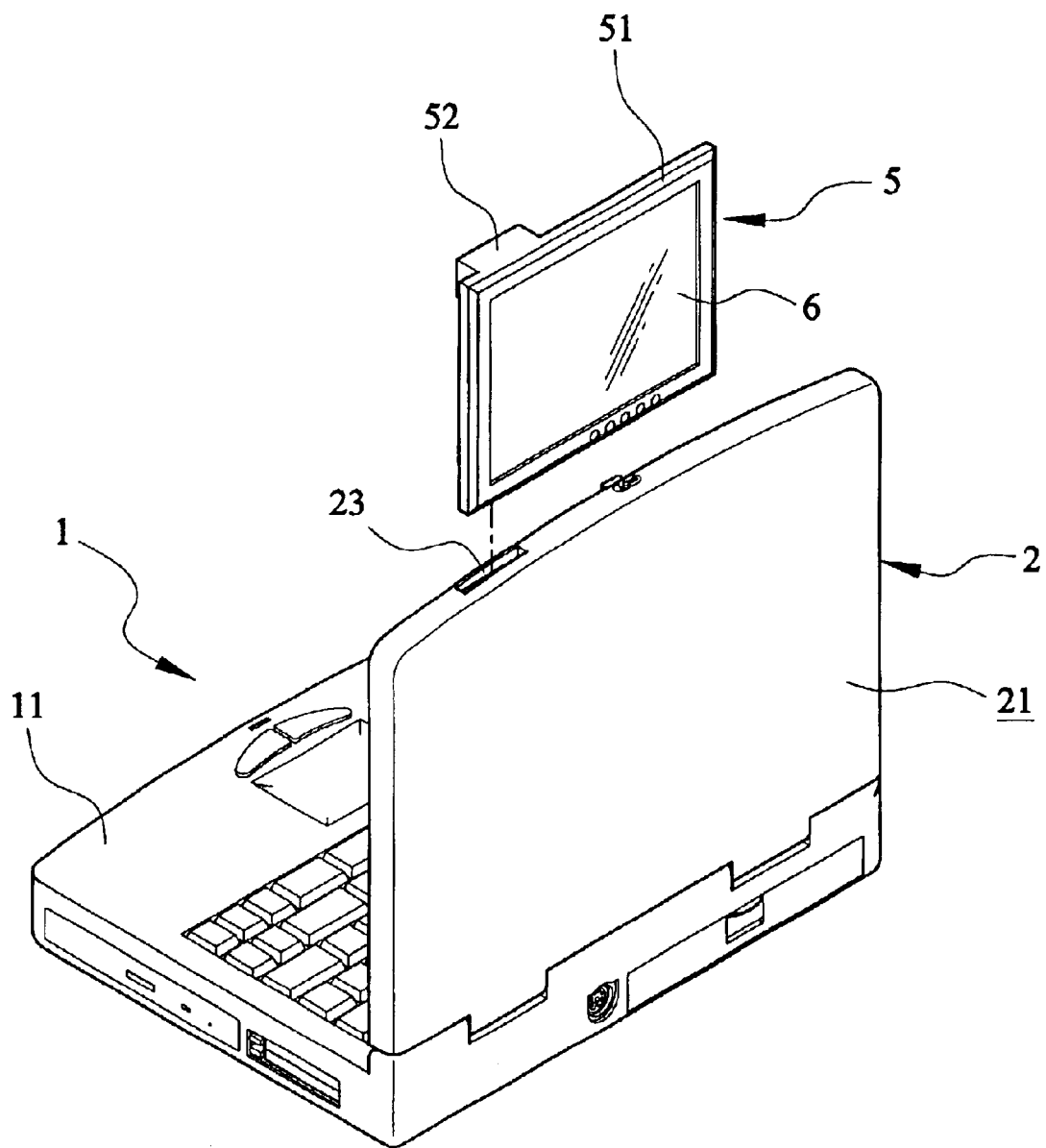
FIG. 6 is an exploded perspective view of FIG. 5 showing the add-on display module is detached from the primary display device of the notebook computer.

FIG. 5 is a rear perspective view of a notebook computer 1 showing an add-on display module 5 according to a third embodiment of the present invention is attached to a rear side 21 of a primary display device 2 of the notebook computer 1. FIG. 6 is an exploded perspective view of FIG. 5 showing the add-on display module 5 is detached from the primary display device 2 of the notebook computer 1.

The add-on display module 5 of the third embodiment of the present invention is also attached to the rear side 21 of the primary display device 2 of the notebook computer 1. However, the add-on display module 5 has a width and a length smaller than those of the add-on display module 3 of the first and the second embodiment. The add-on display module 5 mainly includes a mounting frame 51 for framing a size-reduced secondary display device 6 therein.

The mounting frame 51 is provided at an upper edge with a projected portion 52 similar to that in the second embodiment, and at a predetermined position in the projected portion 52 with a second connector 34 similar to that in the first and the second embodiment for directly aligning with and inserting into the first connector 23 provided at the upper edge of the primary display device 2 of the notebook computer 1. The add-on display module 5 having a reduced size also enables the notebook computer 1 to have a secondary display device 6 detachably provided at the rear side 21 of the primary display device 2 of the notebook computer 1 for convenient use as an auxiliary display device in business briefing, commercial advertising, lecture, forum, etc.

It is noted from the description above, in addition to a primary LCD display device, the portable computer incorporates a secondary display device serving as an auxiliary display device for convenient use in business briefing, commercial advertising, lecture, forum, etc.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An add-on display module adapted to be attached to a primary display device of a portable computer for displaying an image signal transmitted from the portable computer, comprising:

a mounting frame having a fixing means for attaching the mounting frame to a rear side of the primary display device of the portable computer;

a secondary display device framed in the mounting frame; and means for electrically connecting the secondary display device to the primary display device, having a first connector provided on the primary display device of the portable computer and a second connector provided on the secondary display device;

wherein the secondary display device is detachably attached on the rear side of the primary display device of the portable computer by the mounting frame and connected with the primary display device via the connecting means, so as to receive and display the image signal of the portable computer.

2. The add-on display module as claimed in claim 1, wherein the fixing means of the mounting frame comprises a pair of side brackets formed at two opposite sides of the mounting frame for engaging with two opposite sides of the primary display device and thereby attaching the mounting frame and the secondary display device framed in the mounting frame to the rear side of the primary display device of the portable computer.

3. The add-on display module as claimed in claim 1, wherein the fixing means of the mounting frame comprises at least one hooking member for hooking the mounting frame with the secondary display device framed therein onto the rear side of the primary display device of the portable computer.

4. The add-on display module as claimed in claim 1, wherein the fixing means of the mounting frame comprises at least one projected portion, the second connector being mounted in the projected portion and the first connector being provided at an upper edge of the primary display device corresponding to the second connector, so that the mounting frame is attached to the rear side of the primary display device by connecting the second connector into the first connector.

5. The add-on display module as claimed in claim 1, wherein the mounting frame has a width and a length substantially the same as those of the primary display device of the portable computer.

6. The add-on display module as claimed in claim 1, wherein the first connector and the second connector are insertion-type connectors comprising a female connector and a male connector.

7. The add-on display module as claimed in claim 1, wherein the first connector is an infrared emitting port and the second connector is an infrared receiving port.

8. The add-on display module as claimed in claim 1, wherein the image signal shown on the secondary display device is the same as that shown on the primary display device of the notebook computer.

9. The add-on display module as claimed in claim 1, wherein the image signal shown on the secondary display device is different from that shown on the primary display device of the notebook computer.

* * * * *